United States Patent
Hagan et al.

(10) Patent No.: US 12,553,215 B2
(45) Date of Patent: Feb. 17, 2026

(54) FREE ROTATING HYDRAULIC JOINT FOR A VEHICLE ATTACHMENT

(71) Applicant: Branch Manager, Ramsey, MN (US)

(72) Inventors: Mike Hagan, Ramsey, MN (US); Dave Nordgaard, Ramsey, MN (US); Blake Rosen, Ramsey, MN (US); Kevin Staples, Ramsey, MN (US)

(73) Assignee: Branch Manager, Ramsey, MN (US)

( * ) Notice: Subject to any disclaimer, the term of this patent is extended or adjusted under 35 U.S.C. 154(b) by 111 days.

(21) Appl. No.: 18/379,260

(22) Filed: Oct. 12, 2023

(65) Prior Publication Data

US 2024/0151006 A1    May 9, 2024

Related U.S. Application Data

(60) Provisional application No. 63/424,040, filed on Nov. 9, 2022.

(51) Int. Cl.
*F16L 27/08* (2006.01)
*E02F 9/22* (2006.01)

(52) U.S. Cl.
CPC ........ *E02F 9/2275* (2013.01); *F16L 27/0808* (2013.01)

(58) Field of Classification Search
CPC ..... F16L 27/08; F16L 27/084; F16L 27/0812; F16L 27/0824; F16L 27/0816; F16L 27/082; F16L 27/0828; F16L 27/0837; F16L 27/0845; F16L 27/0849; F16L 27/0865; F16L 27/0861; F16L 39/04; E02F 9/2275; E02F 3/3654; E02F 3/3663; E02F 3/413; E02F 3/4135; E02F 3/404; E02F 3/965; E02F 3/3681
See application file for complete search history.

(56) References Cited

U.S. PATENT DOCUMENTS 3,413,029 A  * 11/1968  Donovan ............... E02F 3/3681
                                                294/68.23

* cited by examiner

*Primary Examiner* — Aaron M Dunwoody
(74) *Attorney, Agent, or Firm* — Brooks, Cameron & Huebsch, PLLC (57) ABSTRACT

The present disclosure relates to free rotating hydraulic joint apparatuses and systems for a vehicle attachment. One apparatus includes a swivel component and a coupler wherein the swivel component can freely rotate through 360 degrees with respect to the coupler around one rotational axis and wherein the joint formed by the swivel component and the fluid block component is fluid tight. The fluid block component has a body with two fluid passageways therein, each passageway has an aperture for affixing vehicle-side hose ends, a second end of each passageway having an aperture on a side surface of the fluid block component and an annular passageway portion, each annular portion in fluid communication with a port provided for affixing attachment-side hose ends thereto.

19 Claims, 9 Drawing Sheets

FREE ROTATING HYDRAULIC JOINT FOR A VEHICLE ATTACHMENT

PRIORITY INFORMATION

This application claims the benefit of U.S. Provisional Application No. 63/424,040 filed on Nov. 9, 2022, the contents of which are incorporated herein by reference.

TECHNICAL FIELD

The present disclosure relates generally to free rotating hydraulic joint apparatuses and systems for a vehicle attachment.

BACKGROUND

On construction sites, farms, and industrial plants, skid steer and other vehicles that can utilize hydraulic attachments are versatile vehicles that allow workers to perform many different types of tasks not possible without those vehicles. A skid steer (also referred to as a skid steer loader), is a relatively small piece of heavy equipment that typically has two hydraulic lifting arms on each side and is valued for the number of attachments that are available to be connected to it.

One issue that arises, particularly when working with a grapple attachment, is that when the attachment rotates, the hydraulic hoses get in the way of the rotation of the attachment. This can cause damage to the hoses, by them getting tangled and potentially tearing, damage to the equipment, for example at the hose junctions or seals, and downtime to the workforce.

DETAILED DESCRIPTION

The present disclosure relates generally to hydraulic joint apparatuses. Specifically, the present disclosure relates to free rotating hydraulic joints for use in connecting an attaching apparatus to a vehicle.

In the embodiments of the present disclosure, the hydraulic vehicle-side hoses that carry the hydraulic fluid, used to articulate the attachment with respect to the orientation of the vehicle, are positioned within an attachment arm that is used to connect the attachment to the vehicle. The vehicle-side hoses, then exit through an opening in one end of the arm and transit between the opening in the end of the arm and an opening in the connection joint.

The opening in the connection joint is directly in-line with the joint itself. The connection has a hose connector thereon for affixing an end of the hydraulic tubes in such a manner as to allow the attachment to be able to rotate through 360 degrees of freedom on a plane transverse to the axis of the connection.

One example apparatus embodiment includes a swivel component and a coupler wherein the swivel component can freely rotate through 360 degrees with respect to the coupler around one rotational axis and wherein the joint formed by the swivel component and the fluid block component is fluid tight. The fluid block component has a body with two fluid passageways therein, each passageway has an aperture for affixing vehicle-side hose ends, a second end of each passageway having an aperture on a side surface of the fluid block component and an annular passageway portion, each annular portion in fluid communication with a port provided for affixing attachment-side hose ends thereto.

Discussed herein are more embodiments of the present disclosure that provide novel advantages over the prior art.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1A:
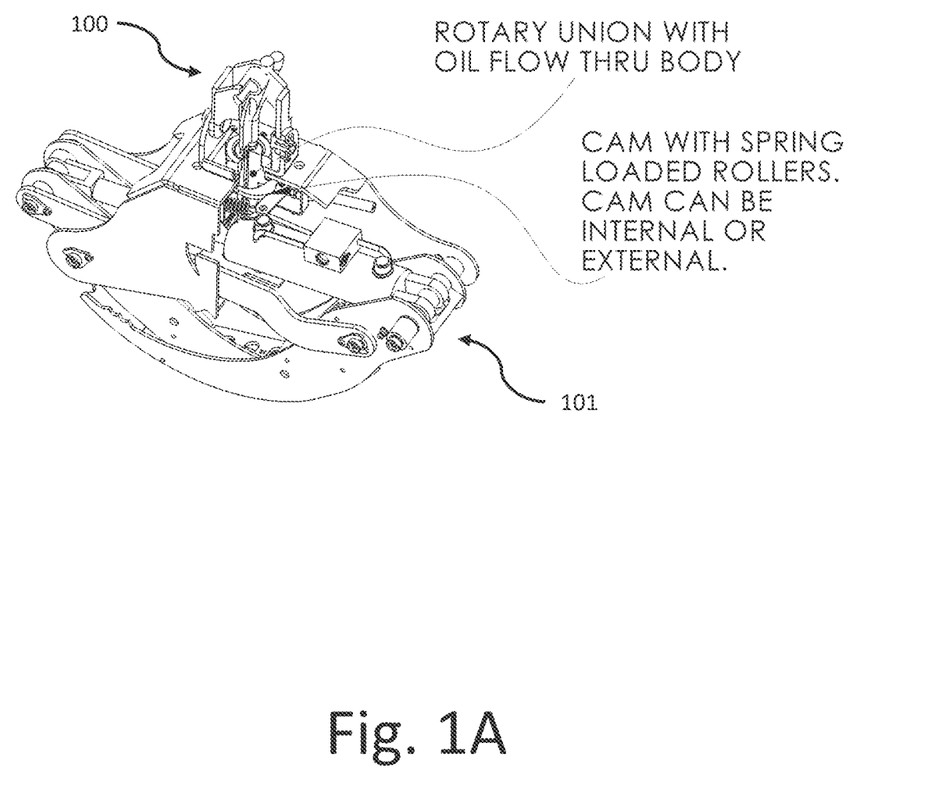
FIG. 1A is an illustration of a side elevated perspective view of an embodiment in accordance with the present disclosure connected to an attachment used by a vehicle.

FIG. 1A is an illustration of a side elevated perspective view of an embodiment in accordance with the present disclosure connected to an attachment used by a vehicle. FIG. 1A illustrates an embodiment of the joint 100 connected, via a rotary union, to a grapple attachment 101.

The rotary union includes a flow through body that allows hydraulic fluid (e.g., oil) to pass from a vehicle onto which the attachment (e.g., a grapple) is connected, through the joint 100, and into a hydraulic system on the attachment 101. The hydraulic system of the attachment 101 allows the movement of the attachment 101 with respect to the vehicle to which it is connected.

The embodiment shown allows 360 degree rotation at the rotary union joint 100. This can be particularly beneficial for use with a grapple attachment as the attachment can fully rotate around the central axis (660 of FIG. 6A) of the joint 100, for example, to allow it's pincers 103 to open and close to, for example, pick up logs that can be at various angles to the vehicle. For instance, the rotary union rotationally connects the coupler and the attachment and thereby abuts a bridging portion of the coupler with a top surface of an attachment.

Figure 1B:
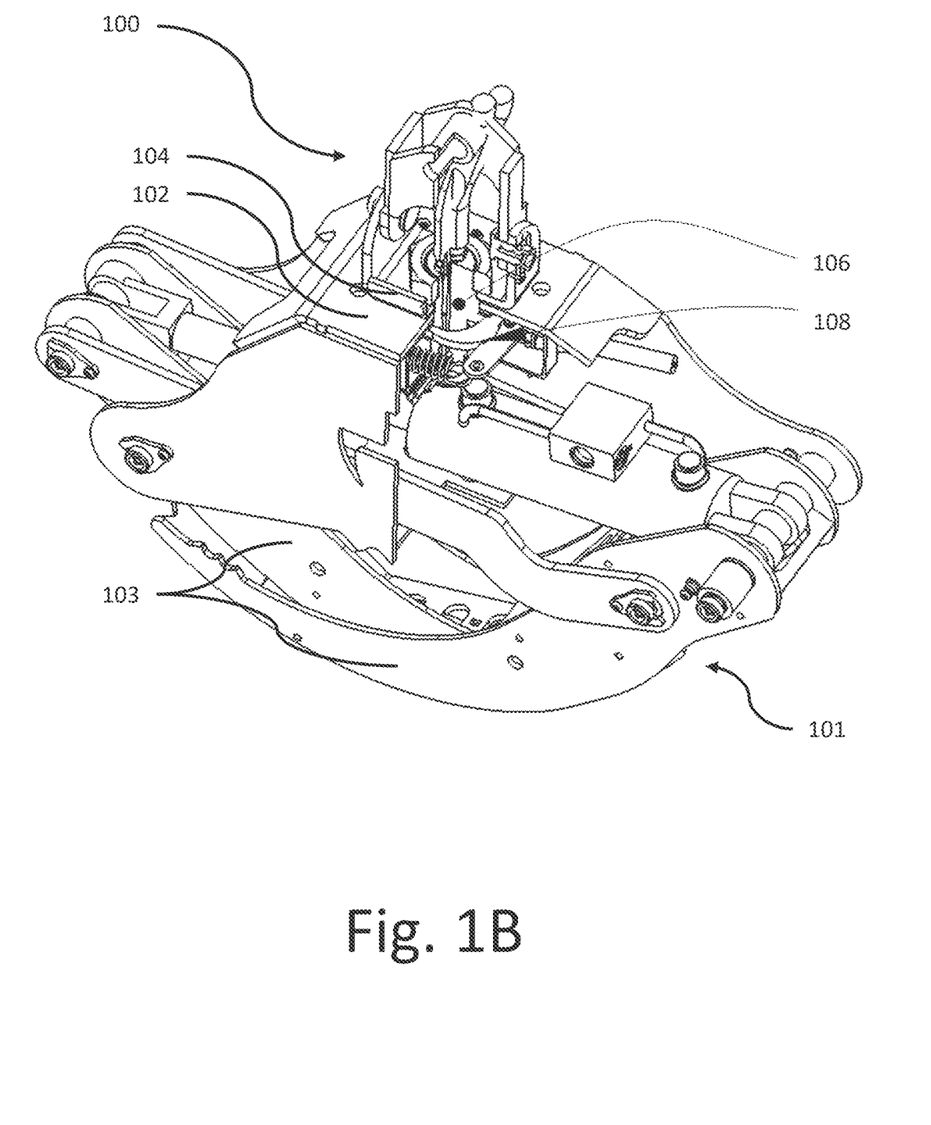
FIG. 1B is a closer up illustration of the side elevated perspective view of FIG. 1A.

FIG. 1B is a closer up illustration of the side elevated perspective view of FIG. 1A. Here, again, the embodiment shown allows 360 degree rotation at the rotary union joint 100 while the rotary union 106 includes a flow through body (having an aperture therethrough which is a fluid tight connection) that allows hydraulic fluid (e.g., oil) to pass from a vehicle onto which the grapple attachment is connected, through the joint 100 (e.g., coupler and swivel component), and into a hydraulic system on the attachment 101 and allows 360 degree rotation at the rotary union joint 100 and controls operation of the pincers (i.e., opening and closing).

The rotary joint 100 has a first portion 102 that rotates with respect to a second portion 104. The connection between the first portion and second portion is such that the first portion can freely rotate through 360 degrees with respect to the second portion around one rotational axis and repeatedly can make such rotations (e.g., 720 degrees, 1080 degrees, or partial or full rotations more or less than these examples). In some embodiments, the first portion can be part of the attachment and the second portion can be part of the connection between the attachment and the vehicle.

The embodiment of FIG. 1B also illustrates another unique feature. At 108, the Figure shows a cam with spring loaded rollers that allow the attachment to position itself at any degree along the 360 degree rotation (349, 006, 278, etc.) based on the profile of the cam.

Figure 1C:
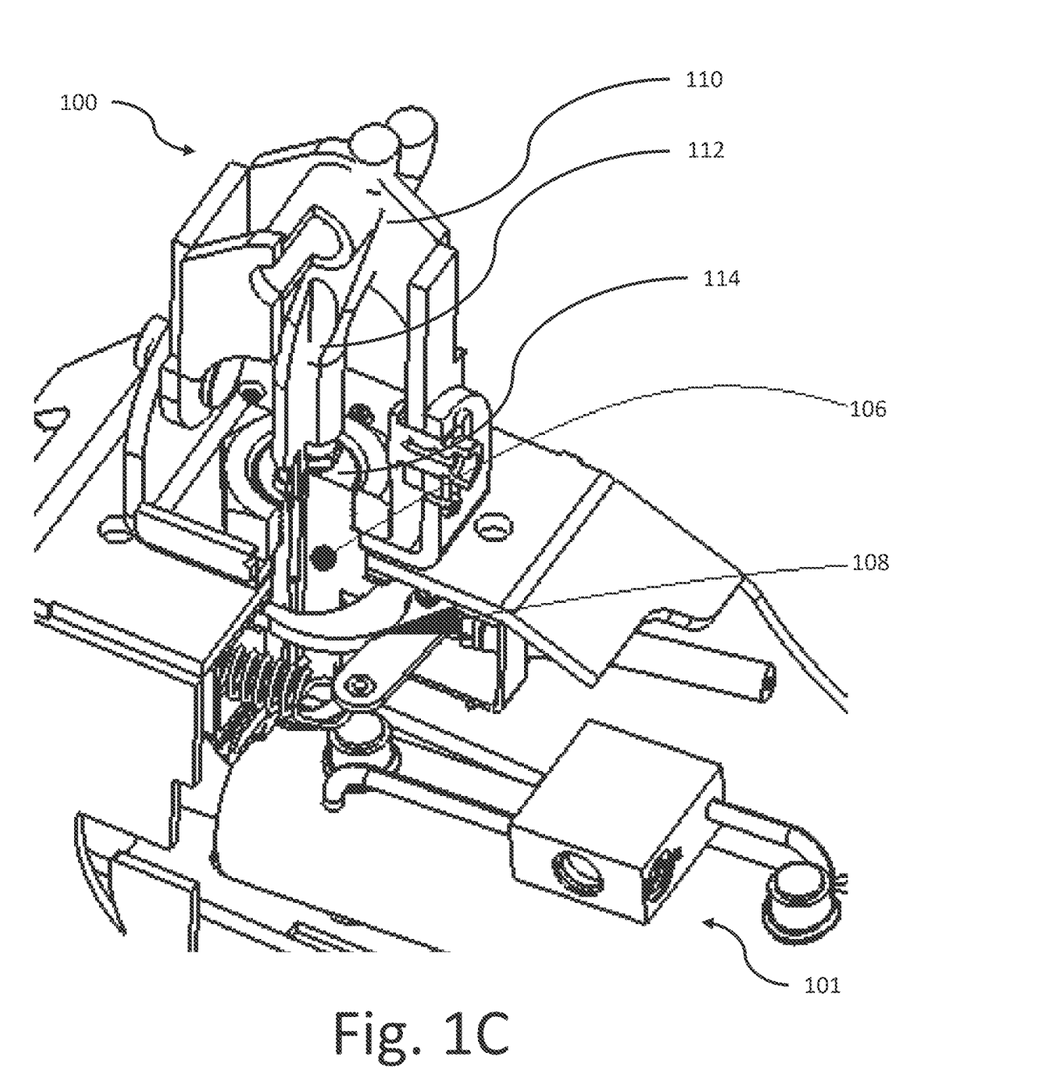
FIG. 1C is a closer up illustration of the side elevated perspective view of FIG. 1B that focuses on the free rotating hydraulic attachment joint.

FIG. 1C is a closer up illustration of the side elevated perspective view of FIG. 1B that focuses on the free rotating hydraulic attachment joint. FIG. 1C shows a coupler housing 110 of the joint 100. It has two hoses 112 entering the housing 110, positioned in a cavity in the housing, and then exiting the housing and entering the rotary union through an end cap 114 of a hose passage component, the end cap 114 having apertures for each of the two hoses to connect thereto to allow fluid communication between the hoses and the rotary union.

The end cap is arranged so that the central axis of the joint passes through it. In this manner, the moving parts of the joint can rotate, while the hoses do not. This allows them to keep from twisting with each other and tangling on components of the joint, vehicle, or attachment.

Figure 2:
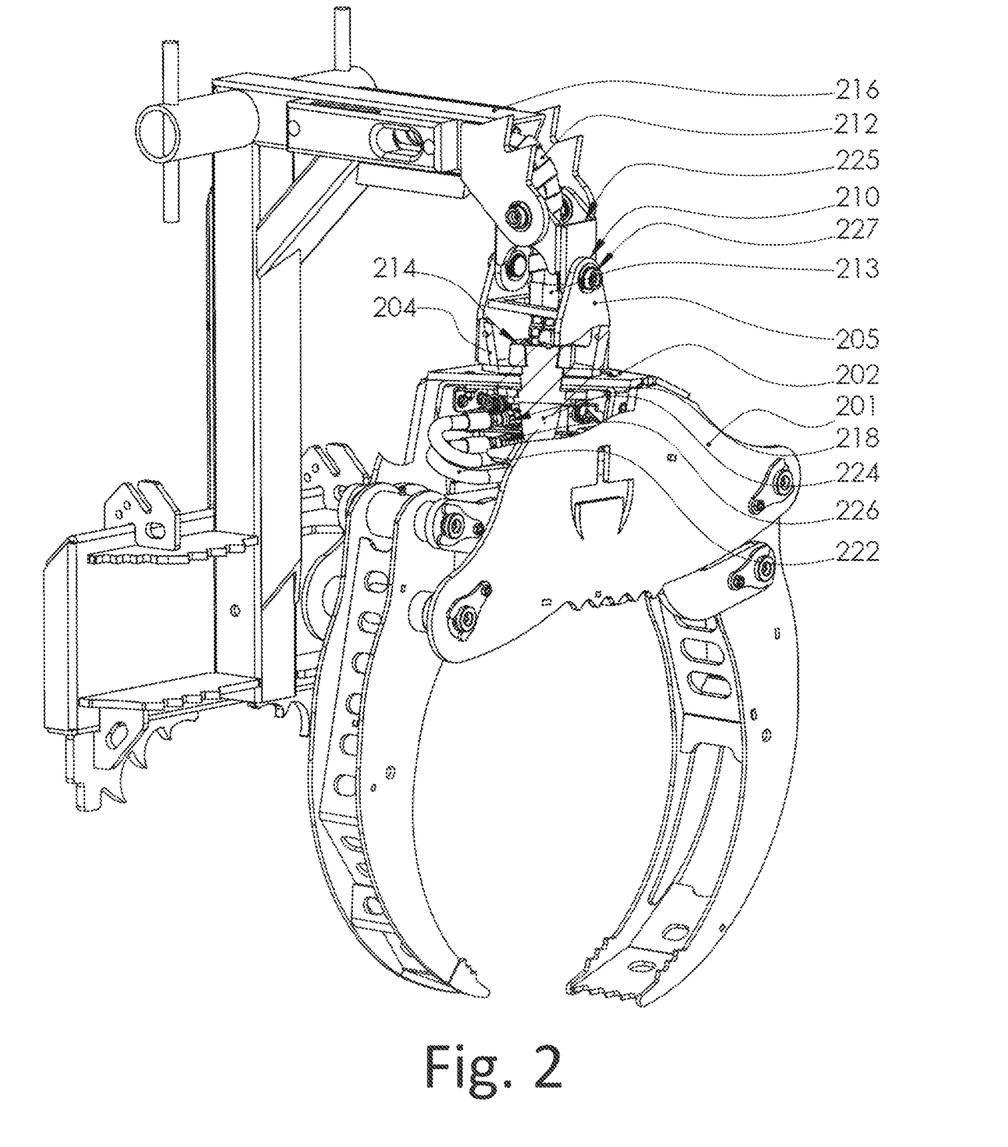
FIG. 2 shows an angled elevated perspective view of an embodiment in accordance with the present disclosure connected to an attachment and a vehicle.

FIG. 2 shows an angled elevated perspective view of an embodiment in accordance with the present disclosure connected to an attachment and a vehicle. In this embodiment, the vehicle has an extending arm 216 that has two ends with a tunnel therebetween. The hydraulic hoses 212 that provide fluid to the attachment are arranged through the tunnel and are shown emerging from one of the ends tunnel of the arm 216.

The rotary joint is constructed of several parts. For example, a linking member 225 is used to connect the rotary joint to the vehicle (arm 216). The linking member also has an aperture through its linking member body that allows the hoses 212 to be positioned therethrough, allowing the linking member to move without tangling or twisting the hoses.

A coupler 210 has two flanges 205 that are arranged to attach to the linking member 225 (via pin and retainer connections 227). The vehicle and the linking member can also be connected with nut and bolt connections or other connection types that allow the vehicle, linking member, and/or coupler to move with respect to each other. The ends of the hoses 213 are connected to the end cap 214 that is attached to a bridging section 204 between the flanges 205.

The bottom surface of the bridging section 204 abuts a top surface 202 of the attachment 201. This connection is rotational, allowing the attachment 201 to rotate while the vehicle-side hose ends 213 do not, thereby preventing them from twisting or tangling. Also shown in FIG. 2 are some components of the hydraulic system of the attachment, including the hydraulic block 218 that enables the movement opening, closing, and rotation of the grapple's pincers, and hose 222 having two attachment-side ends 224 and 226, with one end 224 connected to the block 218 and the other end connected to a cylinder (shown in FIG. 5).

Figure 3:
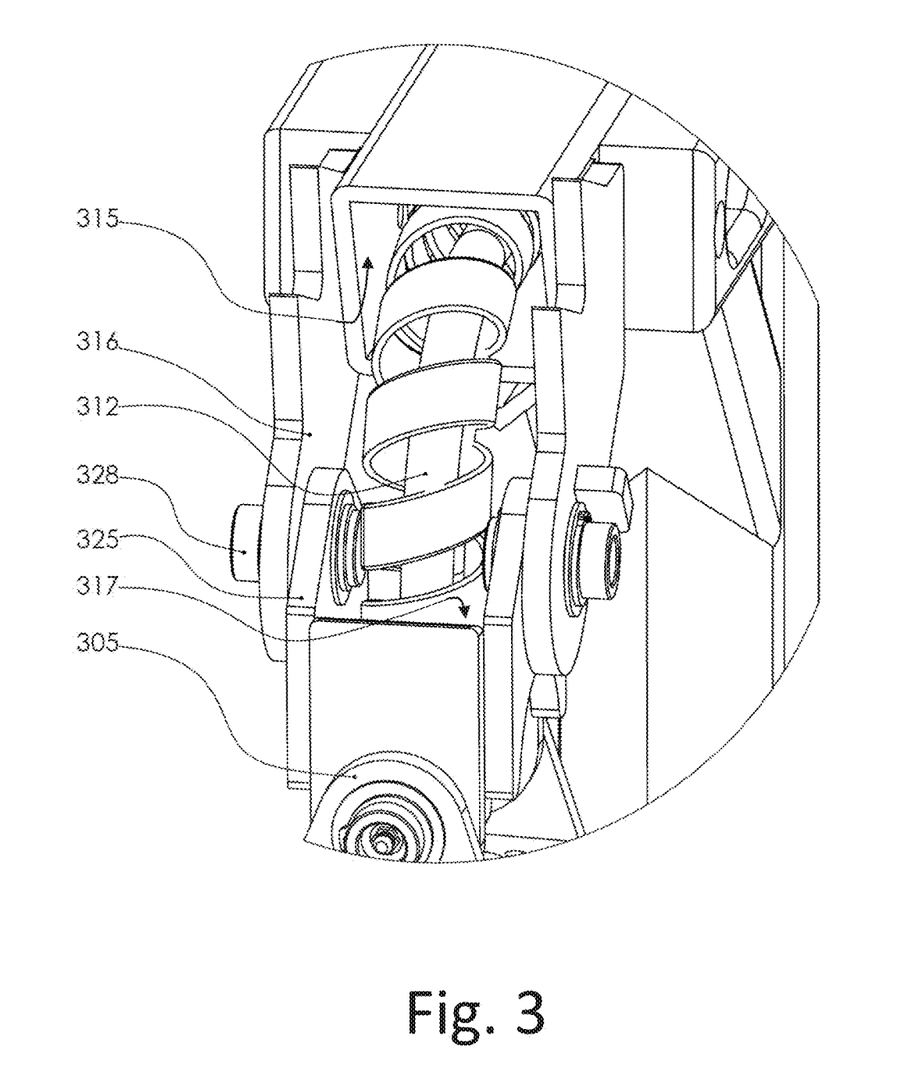
FIG. 3 shows a close up view of a connection between an embodiment in accordance with the present disclosure, an attachment, and a vehicle.

FIG. 3 shows a close up view of a connection between an embodiment in accordance with the present disclosure, an attachment, and a vehicle. In FIG. 3, the hoses 312 emerge from the tunnel 315 through the arm 316 of the vehicle and through the aperture 317 of the linking member 325.

The nut and bolt fastening arrangement 328 can also be seen in FIG. 3. This arrangement allows the arm 316 and the linking member 325 to move with respect to each other by rotating around the central axis of the bolt. Also shown is one of the flanges 305 of the coupler body. This relationship will be discussed in more detail below.

Figure 4:
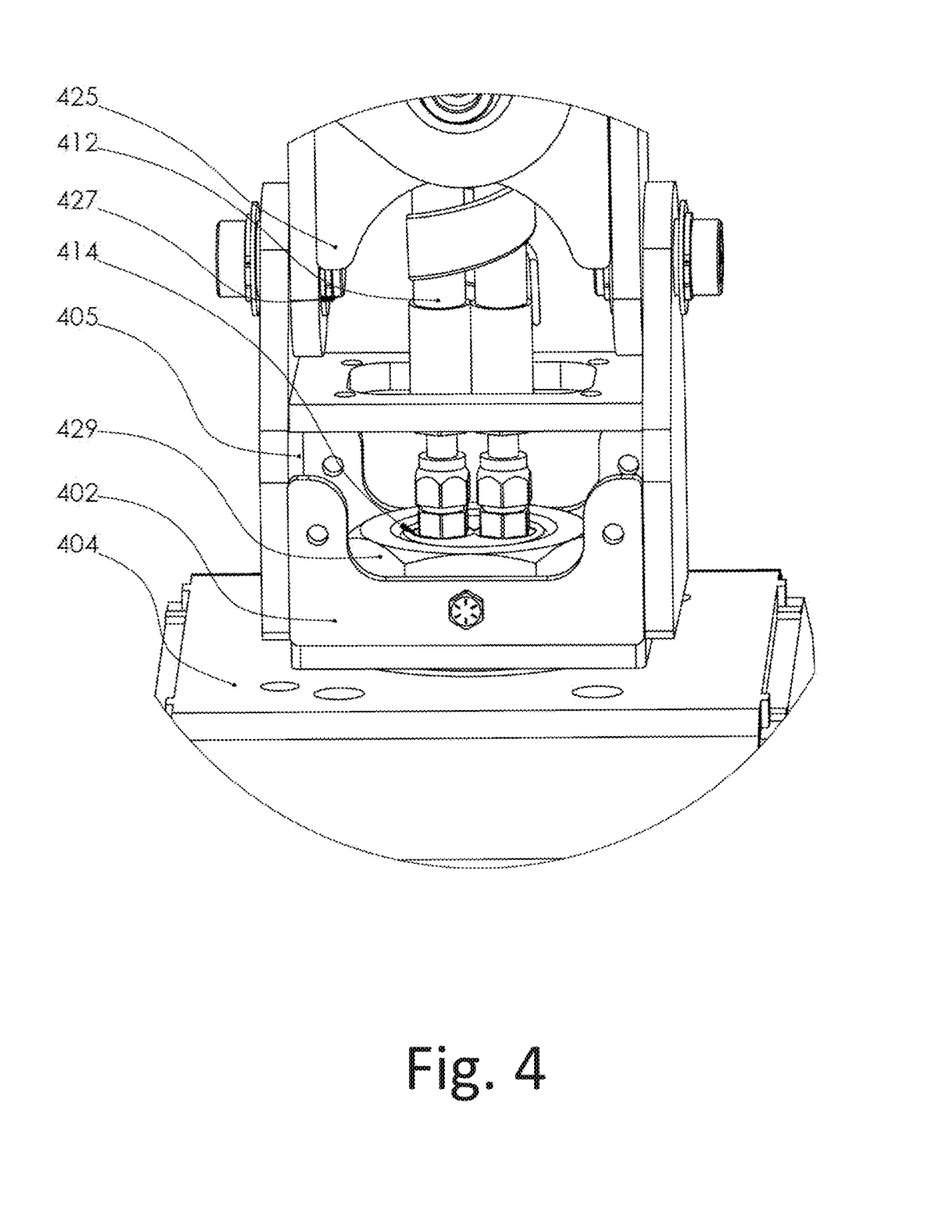
FIG. 4 shows a close up view of a hydraulic hose connection of an embodiment in accordance with the present disclosure.

FIG. 4 shows a close up view of a hydraulic hose connection of an embodiment in accordance with the present disclosure. In FIG. 4, the linking member 425 is attached to the flanges 405 of the coupler body via nut and bolt arrangements 427.

In this view, the hoses 412 emerge from the aperture in the linking member 425 and extend downward to connect to the end cap 414 of the rotary union. The rotary union is affixed to the bridging portion 402 of the coupler with a nut 429 having the end cap 414 positioned at its center. The rotary union rotationally connects the coupler and the attachment and thereby abuts the bridging portion 402 of the coupler with the top surface 404 of the attachment.

Figure 5:
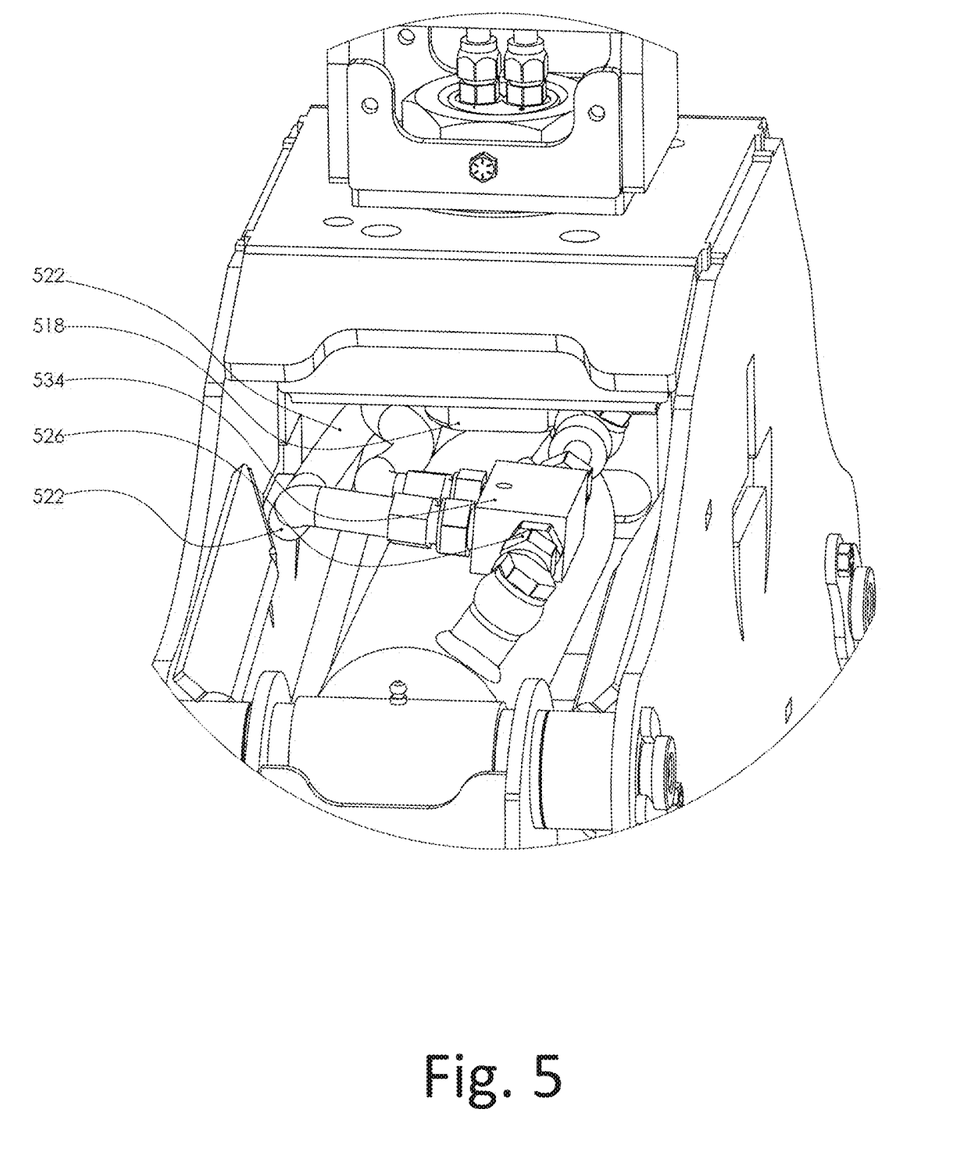
FIG. 5 shows a close up view of another hydraulic hose connection of an embodiment in accordance with the present disclosure.

FIG. 5 shows a close up view of another hydraulic hose connection of an embodiment in accordance with the present disclosure. FIG. 5 shows the hydraulic system of the attachment. Here, one end 524 of hose 522 is attached to the hydraulic system block 518 and the other end 526 is attached to a hydraulic cylinder 534. This enables hydraulic fluid located on the vehicle to be fed from the vehicle through vehicle-side hoses, through the rotary union, and into the attachment's hydraulic system to actuate the attachment.

Figure 6A:
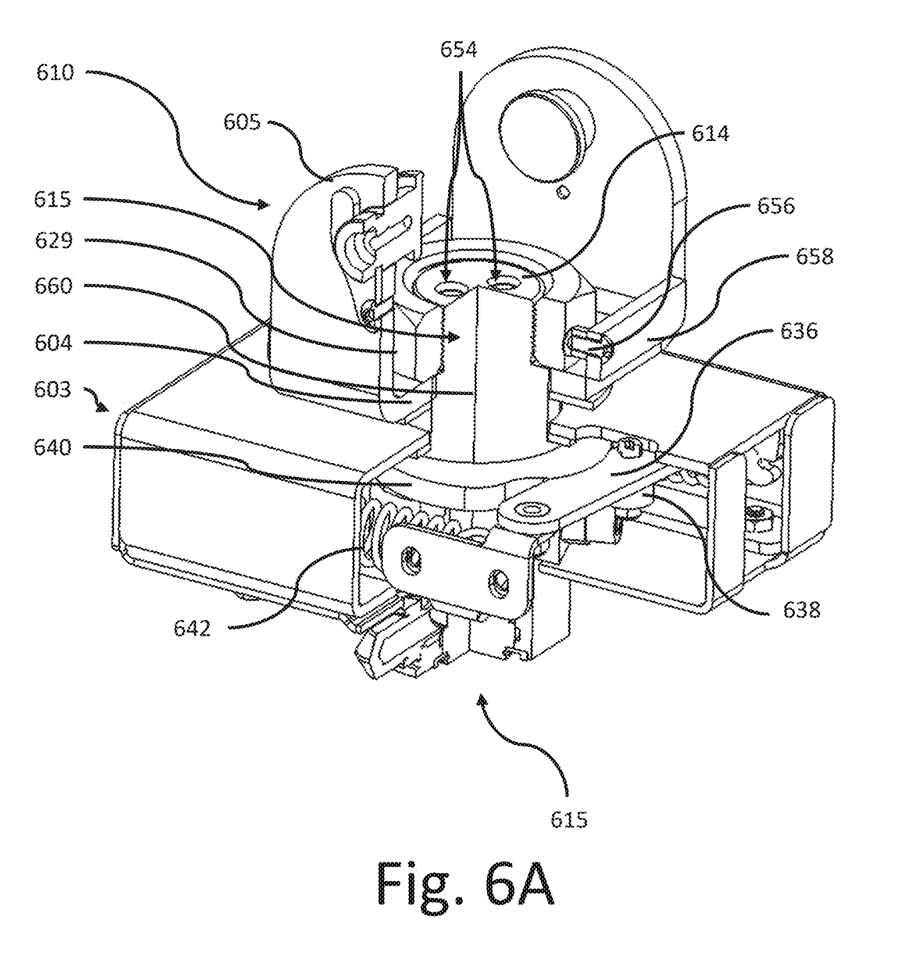
FIG. 6A is an illustration of an angled top perspective view of an embodiment in accordance with the present disclosure.

FIG. 6A is an illustration of an angled top perspective view of an embodiment in accordance with the present disclosure. In this Figure, the joint apparatus shows the features of the coupler 610 and the swivel component 603. The coupler 610 and swivel component 603 are connected such that the swivel component can rotate with respect to the coupler (around the central axis 660). As discussed above, the swivel component can be integrally built into the attachment, for example, into the top of a grapple attachment as shown in FIG. 2.

In the embodiment of FIG. 6A, the coupler 610 includes flanges 605 and a bridging section 604 therebetween. Mounted through an aperture in the bridging section 604 is a fluid block component 615 having an end cap 614. The fluid block component 615 has a body with two fluid passageways therein, each fluid passageway has an aperture 654 on one end formed in the end cap 614 on the top surface of the fluid block component 615 (621 and 625) for affixing vehicle-side hose ends thereto. The joint formed by the swivel component and the fluid block component is fluid tight.

The second end of each passageway has an aperture on a side surface of the fluid block component and an annular passageway portion, each annular passageway portion in fluid communication with an outlet and wherein the outlets are provided for affixing attachment-side hose ends thereto. The vehicle-side hoses (e.g., 212) are connected at one end to apertures 654 and communicate fluid through one or more fluid passageways to annular orifices (passageway portions 621 and 625 of FIG. 6B) in body 615 to outlets 623 and 624. As can be seen, the vehicle-side hoses emerge from an aperture in the linking member and their ends are connected to the apertures in the end cap. Specifically, one hose connects to the orifice 621 that feeds fluid to outlet 624 and the other hose connects to the orifice 625 that feeds fluid to outlet 623.

The orifices 621 and 625 are annular around the central axis 660 thereby connecting the hoses to the outlets via the passageways regardless of the orientation of the attachment. This arrangement allows for free rotation in 360 degrees of motion of the attachment around the central axis 660.

The top portion of the fluid block component 615 is fixed in position by being threaded to a nut 629. The nut is fixed in position by a number of stop structures 656 that are mounted to the nut 629 and abut strut surfaces 658 of the coupler body.

The bottom portion of the fluid block component rotates with the swivel component 603 and the fluid is distributed from the one or more cavities 621 and 625 in the block component 615 to hoses (e.g., 222 of FIG. 2) via one or more ports 623 and 624. The ports, in a grapple attachment, can, for example, each supply one of the pincers of the grapple.

The cam structure discussed above is shown in more detail in FIG. 6A. Here, a cam 640 is shown having an irregularly shaped perimeter. The cam interacts with a detent to stop and allow the rotational movement of the first portion wherein if the detent is engaged (positioned in) with a feature (e.g., shallow spot) on the cam perimeter, the rotational movement of the attachment is stopped and/or further rotation is prevented. When the detent is disengaged with a feature on the cam perimeter, the rotational movement of the attachment is stopped and/or further rotation is prevented. One or more springs 642 are used to return the attachment back to an original position wherein the cam interacts with a roller 638 mounted on a movable cam arm 636 to stop it in particular positions.

Figure 6B:
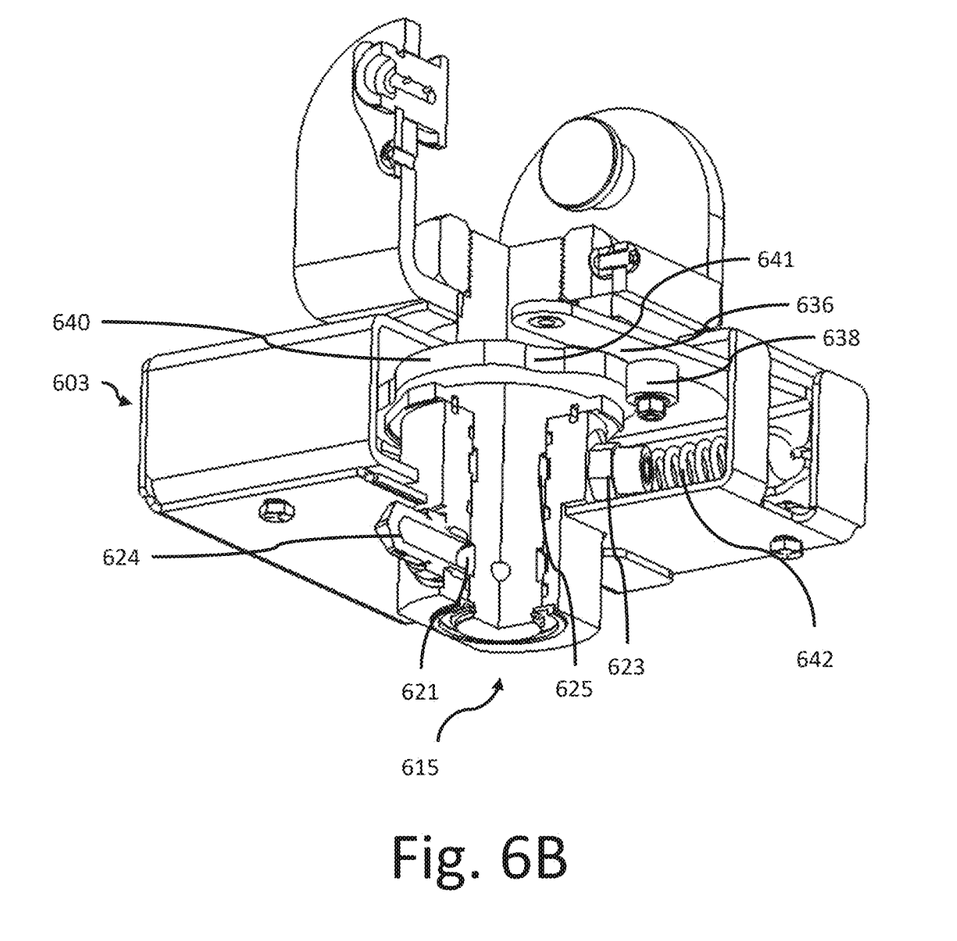
FIG. 6B is an illustration of an angled bottom perspective view of an embodiment in accordance with the present disclosure.

FIG. 6B is an illustration of an angled bottom perspective view of an embodiment in accordance with the present disclosure. FIG. 6B illustrates more about the cam structure and shows some other elements of hose passage component 615.

The cam structure is again shown in more detail in FIG. 6B. In this view, the cam 640 is shown having an irregularly shaped perimeter. In this cam shape, the cam includes a number of shallow spots 641 that are shaped to stop the movement of the cam when aligned with a detent (here, a roller is used as the detent) 638. The cam 640 can freely rotate once the detent is removed from a shallow spot by actuation of the movable cam arm 636. One or more springs 642 are used to regulate movement of the cam, such as to return the attachment back to an original position wherein the cam interacts with the roller 638 mounted on a movable cam arm 636 to stop it in one of a number of particular positions based on the shallow spots. One or more springs can also be connected to the cam arm 636 and used to move the arm during movement of the detent 638.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A free rotating hydraulic joint apparatus for a vehicle attachment, comprising:
   a swivel component and a coupler wherein the swivel component can freely rotate through 360 degrees with respect to the coupler around one rotational axis and wherein the joint formed by the swivel component and a fluid block component is fluid tight; and
   the fluid block component having a body with two fluid passageways therein, each fluid passageway has an aperture on one end formed in an end cap on a top surface of the fluid block component for affixing vehicle-side hose ends thereto, a second end of each passageway having an aperture on a side surface of the fluid block component and an annular passageway portion, each annular passageway portion in fluid communication with a port and wherein the ports are provided for affixing attachment-side hose ends thereto, wherein the body is held in place by a nut fixed in position by a number of stop structures.

2. The free rotating hydraulic joint apparatus of claim 1, wherein the body is held in place by the nut threaded to an outside surface of the fluid block component.

3. The free rotating hydraulic joint apparatus of claim 1, wherein the joint includes a cam having an irregularly shaped perimeter surface that interacts with a detent to stop and allow the rotational movement of the fluid block component.

4. The free rotating hydraulic joint apparatus of claim 3, wherein the joint includes a detent that allows the rotational movement of the fluid block component when the detent is removed from a shallow spot along a perimeter surface of the cam.

5. The free rotating hydraulic joint apparatus of claim 3, wherein the detent that stops the rotational movement of the fluid block component when the detent is positioned in a shallow spot along a perimeter surface of the cam.

6. The free rotating hydraulic joint apparatus of claim 3, wherein a spring is used to regulate movement of the cam.

7. A free rotating hydraulic joint system for a vehicle attachment, comprising:
a swivel component and a coupler wherein the swivel component can freely rotate through 360 degrees with respect to the coupler around one rotational axis and wherein the joint formed by the swivel component and a fluid block component is fluid tight, wherein the joint includes a cam having a perimeter surface that interacts with a detent to regulate movement of the cam; and
the fluid block component having a body with two fluid passageways therein, each fluid passageway has an aperture on one end formed in an end cap on a top surface of the fluid block component for affixing vehicle-side hose ends thereto, a second end of each passageway having an aperture on a side surface of the fluid block component and an annular orifice passageway portion, each annular orifice passageway portion in fluid communication with an outlet and wherein the outlets are provided for affixing attachment-side hose ends thereto.

8. The free rotating hydraulic joint system of claim 7, wherein the annular orifice passageway portions are annular around a central axis of the fluid block component.

9. The free rotating hydraulic joint system of claim 7, wherein the coupler includes multiple flanges and a bridging section therebetween.

10. The free rotating hydraulic joint system of claim 9, wherein a linking member is attached to the flanges of the coupler.

11. The free rotating hydraulic joint system of claim 10, wherein the vehicle-side hoses emerge from an aperture in the linking member and ends of the linking member are connected to the apertures in the end cap.

12. The free rotating hydraulic joint system of claim 7, wherein the joint includes a rotary union that rotationally connects the coupler and the attachment and thereby abuts a bridging portion of the coupler with a top surface of an attachment.

13. The free rotating hydraulic joint system of claim 7, wherein the joint includes a rotary union that is affixed to a bridging portion of the coupler with a nut having the end cap positioned at a center.

14. A free rotating hydraulic joint system for a vehicle attachment, comprising:
a coupler connected to a vehicle;
a swivel component connected to an attachment to the vehicle wherein the swivel component can freely rotate through 360 degrees with respect to the coupler around one rotational axis and wherein the joint formed by the swivel component and a fluid block component is fluid tight, wherein the joint includes a cam having a perimeter surface that interacts with a detent to regulate movement of the cam utilizing a spring; and
the fluid block component having a body with two fluid passageways therein, each fluid passageway has an aperture on one end formed in an end cap on a top surface of the fluid block component for affixing vehicle-side hose ends thereto, a second end of each passageway having an aperture on a side surface of the fluid block component and an annular orifice passageway portion, each annular orifice passageway portion in fluid communication with an outlet and wherein the outlets are provided for affixing attachment-side hose ends thereto.

15. The free rotating hydraulic joint system of claim 14, wherein the attachment is capable of 360 degree rotation via hydraulic fluid that moves from the vehicle through the fluid block component and swivel component and into a hydraulic system on the attachment.

16. The free rotating hydraulic joint system of claim 14, wherein the attachment is a grapple attachment having two pincers and capable of 360 degree rotation via hydraulic fluid that moves from the vehicle through the fluid block component and swivel component and into a hydraulic system on the grapple attachment to rotate the grapple attachment with respect to the fluid block component.

17. The free rotating hydraulic joint system of claim 14, wherein the attachment is a grapple attachment having two pincers and capable of 360 degree rotation via hydraulic fluid that moves from the vehicle through the fluid block component and swivel component and into a hydraulic system on the grapple attachment.

18. The free rotating hydraulic joint system of claim 14, wherein the attachment is a grapple attachment having two pincers and capable of 360 degree rotation via hydraulic fluid that moves from the vehicle through the fluid block component and swivel component and into a hydraulic system on the grapple attachment and wherein the hydraulic system on the grapple attachment controls the operation of the pincers.

19. The free rotating hydraulic joint system of claim 14, wherein the attachment is a grapple attachment having two pincers and capable of 360 degree rotation via hydraulic fluid that moves from the vehicle through the fluid block component and swivel component and into a hydraulic system on the grapple attachment and wherein the hydraulic system on the grapple attachment controls the 360 degree rotation and the operation of the pincers.

* * * * *